Oct. 12, 1948.   H. R. DAVIS   2,451,433
HYDROCARBON EXTRACTION APPARATUS
Filed July 24, 1946
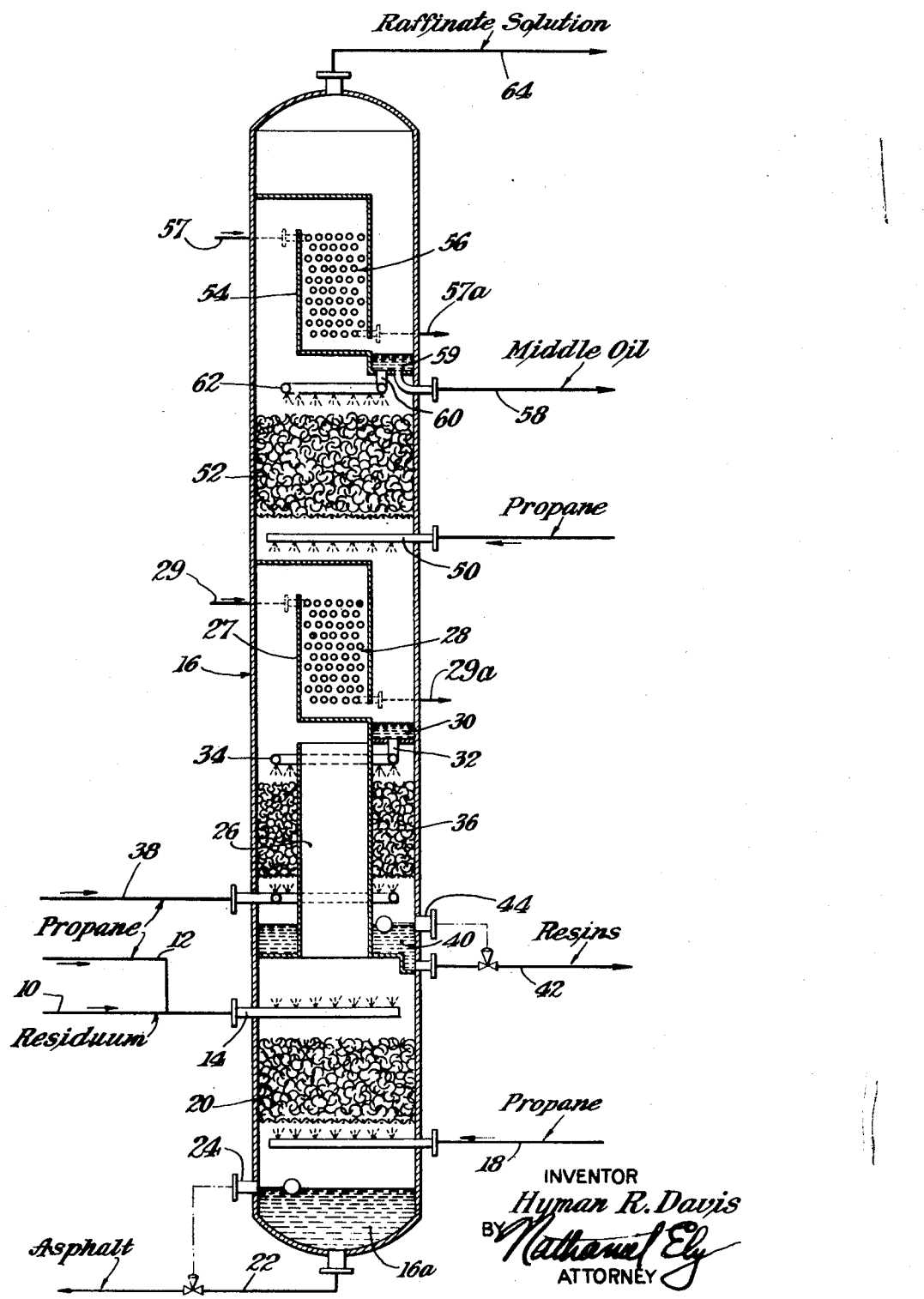
INVENTOR
Hyman R. Davis
BY Nathaniel Ely
ATTORNEY Patented Oct. 12, 1948

2,451,433

UNITED STATES PATENT OFFICE 2,451,433

HYDROCARBON EXTRACTION APPARATUS

Hyman R. Davis, Jackson Heights, N. Y., assignor to The Lummus Company, New York, N. Y., a corporation of Delaware Application July 24, 1946, Serial No. 685,831

2 Claims. (Cl. 196—14.52)

This invention relates to improvements in solvent extraction and more particularly to improved apparatus and methods for the countercurrent extraction of hydrocarbons by the use of propane to provide predetermined cuts of lubricating oil stock, and the resins, asphalts, etc., removed therefrom.

As is well known, it is generaly customary to first vacuum distill a topped crude to produce intermediate viscosity lubricating oil stocks. These are then subsequently treated to remove asphalt and resins and to produce desired viscosity lubricating oil stocks. Such operation requires substantial equipment and is quite expensive.

In accordance with my present invention, I treat the topped residual oil, which is a high molecular weight oil mixture, entirely within a single extraction column. Not only do I thus materially reduce the cost of equipment, intermediate tankage, etc., but I also obtain better products, reduce the losses normally present, and I am also able to make better products.

The principal object of my invention is to provide a simpler process for the solvent extraction of lubricating oil stocks.

A further object of my invention is to provide improved equipment for the simultaneous treatment of lubricating oil stocks to produce desired cuts thereof.

Further objects and advantages of my invention will appear from the following description of a preferred form of embodiment taken in conjunction with the attached drawing, the figure of which is a vertical central section diagrammatically showing one form of apparatus in which the preferred method may be carried out.

In accordance with the preferred form of embodiment of my invention, a residuum at 10, together with a sufficient amount of propane at 12 to reduce the viscosity of the charge, is introduced at 14 to the lower part of tower 16. The section 20 below the feed point is the customary packed ring section having suitable Raschig rings or similar packing material. Asphalt which precipitates at this point is then washed countercurrently with the aid of propane introduced at 18 below the packed section 20.

The asphalt plus the propane in equilibrium in the liquid phase thus collect in bottom section 16a of tower 16 and are drawn off through line 22. Liquid level control 24 is used in the customary manner.

The solution of propane plus deasphalted oil is then passed through an internal flue 26 and by baffles 27, is passed across heater 28 to which a heating fluid may be introduced at 29 with a discharge at 29a. As a result of the temperature increase, the resins precipitate out and are collected in trap 30. They are drawn off through line 32 to a distributing ring 34 located directly over a second packed section 36, the packing of which surrounds internal flue 26.

Additional propane is introduced at 38 below this packed section 36 and is used to countercurrently wash the resins. The trapped wash and resins are collected in trap 40 from which they are drawn off by line 42 under control of liquid level control 44.

The deasphaltized and deresined oil-propane solution then ascends through packed section 52 and then past baffles 54 and downwardly through the second interheater 56 to which a heating medium may be introduced at 57, with the discharge at 57a. This results in the precipitation of an oil intermediate in characteristics between the required deasphaltized and deresinated products, and the previously mentioned resin fraction, such middle oil being collected in trap 59 and continuously withdrawn at 58. This provision also results in the setting up of a wash system through line 60, which is distributed in part over packed section 52 by means of distributing ring 62. A final raffinate completely free of resins is withdrawn as overhead at 64.

By extending the tower vertically and by the addition of additional sections with baffles, and by the addition of further interheaters, it will be possible to remove other various oils at a point of the tower vertically above the resin removal point. If a number of points of withdrawal are added, one point for each interheater, a separate fraction would be taken off at each interheater point. The precipitated oils adjacent the highest interheater would be of intermediate viscosity; at a lower interheater the viscosity would increase; at a still lower interheater resins would be taken out; while asphalt would be taken off from the bottom of the tower.

The overhead product at 64 consists of propane carrying in solution with it the lowest viscosity oil.

A tower construction of this type completely replaces the vacuum distillation unit since by charging a gas-oil-free residual stock it is possible to segregate asphalts, resins and several grades of lubricants in a single operation. It also saves substantially in tankage and other intermediate equipment.

The pressure on the tower may be in the order of 450 pounds per sq in. to 600 pounds per sq in. Temperatures in such case will range from 95° F. to 135° F. at the bottom and will increase to a temperature at the top which may vary from 155° F. to 190° F., depending upon the number of interheaters and the desired qualities of the fractions withdrawn.

It will be understood that propane may be a relatively pure $C_3$ fraction but I intend it to also have the connotation of commercial propane which usually has some parts of methane, butane and other hydrocarbons, all of which result in a material having substantially all of the physical characteristics of propane.

It is, of course, to be understood that my system and apparatus will permit a continuous operation and by varying the intermediate temperatures I can rather carefully control each side stream. My apparatus has no mechanical parts, but I can obtain a highly effective countercurrent contact in a simplified apparatus.

Although the sections 20, 36 and 52 are indicated as packed sections, and are preferably provided with Raschig rings or similar packing material their purpose is to insure intimate countercurrent contact and, I therefore, may use, without modifying my invention, other forms of countercurrent contact apparatus such as perforated plates, bubble cap decks or other well known constructions.

While I have shown and described a preferred form of embodiment of my invention, I am aware that other modifications may be made thereto.

I claim:

1. A countercurrent extractor comprising a tower having lower, intermediate and upper sections, means for introducing a high molecular weight oil mixture and a liquefied normally gaseous solvent into the tower between the lower and intermediate sections, a packing in said lower section whereby a heavy component precipitated from said mixture is deposited thereon, means to introduce solvent to said tower below said packing and upwardly in countercurrent relation to the precipitated heavy component to further wash the same, means to draw off the heavy component at the bottom of the tower, an annular body of packing in the intermediate section of the tower, a heat exchanger above said packing, arranged so that all ascending fluids must pass through said heat exchanger, a reflux trap for collecting a precipitated light component, means to distribute said light component on the annular packing, means to wash said light component with some of the ascending solvent, means to collect and discharge the washed light component from the tower, a heat exchanger in the upper section of said tower, a reflux collecting trap below said heat exchanger, and a reflux distributing means below said collecting trap, means to wash said reflux for precipitating a still lighter component from said mixture and solvent flowing through the top section, and means to discharge a refined raffinate solution from the top of said tower.

2. A countercurrent solvent extraction and fractionation tower having a bottoms reservoir, means to remove asphalt therefrom, a first packed section, means to feed a residuum thereto to pass by gravity therethrough, means to feed propane below said first packed section to wash precipitated asphalt from said residuum, an internal flue located above said first packed section for upwardly moving deasphalted oil and propane, a second packed section surrounding said flue, a heat exchange unit above said flue, baffles arranged about said heat exchange unit for forcing said deasphalted oil and propane to pass vertically downwardly over said heat exchange unit, a trap for precipitated liquid resins, means to distribute said resins over said second packed section, means to introduce propane to wash said resins, means to separately collect and remove said washed resins, a third packed section above the second packed section and in communication therewith through said heat exchange unit, means to wash deresinated oil from said second packed section moving to said third packed section, a second heat exchange unit in the path of said upwardly moving oil, baffles arranged about said second heat exchange unit for forcing the oil to take a downwardly moving path through the second heat exchange unit, a trap below said second heat exchange unit for the removal of a middle oil, means to distribute some of the liquid in said trap over the third packed section as wash, and means to remove a final raffinate free of resins as overhead from the tower.

HYMAN R. DAVIS.

REFERENCES CITED

The following references are of record in the file of this patent:

UNITED STATES PATENTS

| Number | Name | Date |
|---|---|---|
| 2,116,428 | Fenske | May 3, 1938 |
| 2,135,009 | Landau | Nov. 1, 1938 |
| 2,149,574 | Brown | Mar. 7, 1939 |
| 2,213,798 | Anne | Sept. 3, 1940 |
| 2,239,470 | Schick | Apr. 22, 1941 |
| 2,367,671 | Dickinson et al. | Jan. 23, 1945 |